United States Patent [19]

Schorter

[11] Patent Number: 5,159,556
[45] Date of Patent: Oct. 27, 1992

[54] LAND NAVIGATION SYSTEM DISPLAYING THE POSITION OF A VEHICLE IN REAL TIME

[75] Inventor: Michel Schorter, Le Perray, France
[73] Assignee: Thomson-CSF, Puteaux, France
[21] Appl. No.: 418,411
[22] Filed: Aug. 24, 1989
[30] Foreign Application Priority Data
  Sep. 2, 1988 [FR] France .................. 88 11497
[51] Int. Cl.$^5$ ............................................ G06F 15/50
[52] U.S. Cl. ................................. 364/449; 364/443; 340/990; 340/995
[58] Field of Search ............. 364/443, 444, 449; 340/988, 990, 995; 73/178 R; 342/451

[56] References Cited

U.S. PATENT DOCUMENTS

| | | | |
|---|---|---|---|
| 4,688,176 | 8/1987 | Hirata | 364/449 |
| 4,758,959 | 7/1988 | Thoone et al. | 364/449 |
| 4,774,671 | 9/1988 | Itoh et al. | 364/449 |
| 4,792,907 | 12/1988 | Ikeda et al. | 364/449 |
| 4,807,127 | 2/1989 | Tenmoku et al. | 340/988 |
| 4,812,845 | 3/1989 | Yamada et al. | 364/449 |
| 4,814,989 | 3/1989 | Döbereiner et al. | 364/449 |
| 4,878,170 | 10/1989 | Zeevi | 364/449 |
| 4,879,658 | 11/1989 | Takashima et al. | 364/449 |
| 4,882,689 | 11/1989 | Aoki | 364/449 |
| 4,893,246 | 1/1990 | Iihoshi et al. | 340/988 |

FOREIGN PATENT DOCUMENTS

| | | |
|---|---|---|
| 0103847 | 3/1984 | European Pat. Off. . |
| 3434896 | 4/1986 | Fed. Rep. of Germany . |
| 3608658 | 9/1986 | Fed. Rep. of Germany . |
| 2174497 | 5/1986 | United Kingdom . |

OTHER PUBLICATIONS

Bosch Techn. Berichte vol. 8, Nos. 1, 2, 1986.

*Primary Examiner*—Gary Chin
*Attorney, Agent, or Firm*—Roland Plottel

[57] ABSTRACT

A land navigation system, e.g. for a vehicle, which compensates for deviations and drifts of the system sensors. The system has movement sensors, the signals of which are digitalized to make periodic computations of the estimated position of the vehicle. A memory stores the estimated route. A digital cartographic data base is read to extract and memorize the useful zone of the route to be displayed and the coordinates of a readjustment point. A central processing unit for management and computation is programmed to compute deviation measurement between the estimated position and the real position of the vehicle at each readjustment point, and to give compensation parameters that are memorized and used during the next readjustment operation, and so on.

6 Claims, 10 Drawing Sheets

FIG. 15 ly to a land navigation system, and more particularly to such systems which display, in real time, the position of a vehicle on a map, through an automatic readjustment or correction procedure using digital cartographic data stored in a mass storage unit or mass memory.

LAND NAVIGATION SYSTEM DISPLAYING THE POSITION OF A VEHICLE IN REAL TIME

BACKGROUND OF THE INVENTION

1. Field of the Invention

The present invention related generally to a land navigation system, and more particularly to such systems which display, in real time, the position of a vehicle on a map, through an automatic readjustment or correction procedure using digital cartographic data stored in a mass storage unit or mass memory.

2. Description of the Prior Art

The knowledge and real time display, in an autonomous fashion, of the position of a moving land vehicle requires the installation of the following elements in it:

sensors of position, speed and/or acceleration in one or more axes;

a computing device that uses the data given by the sensors to determine the position of the vehicle in terms of geographic coordinates with respect to a universal or local reference system;

a display device to display the position of the vehicle, either by light indication in the form of an alphanumerical or cartographic display, for example by forming a light dot or hair cross on a map (displayed on a display screen on printed or a transparent or paper medium);

an interface circuit between the system and the operator giving the latter, generally the driver of the vehicle, the possibility of initializing the position of the vehicle at the start, and of then actuating the positioning readjustments.

The precision of the localization is directly linked to that of the sensors: this is why the autonomous navigation systems necessitate readjustments to compensate for measurement deviations resulting from imprecision and drifts in the sensors (gyrometers, gyroscopes, odometers, magnetic compasses etc.). These readjustments may be periodic or achieved under certain predetermined conditions. Their frequency is related chiefly to the precision of the sensors, but the choice of high-performance sensors results in high-cost approaches.

SUMMARY OF THE INVENTION

The land navigation system according to the invention enables the use of low-performance, hence inexpensive, sensors and makes it possible to compensate for the deviations and drifts of these sensors by using a particular procedure to perform the readjustment operations. It can be used, by means of a digitalized cartographic data base, to perform an automatic readjustment in real time of the estimated route resulting from the measurements of the sensors on the route actually taken by the vehicle. Using these measurements, a computation is made of the differences between these two routes. Corrective action is then taken, producing automatic compensation for errors of any kind (stable position, slope, temperature, acceleration, unbalance etc.).

According to an aspect of the invention, there is provided a land navigation system displaying the position of a vehicle in real time, said system including:

sensors to prepare signals representing parameter movement of the vehicle, including, at least, information on the distance travelled from a reference position and the information on direction of the vehicle;

means for processing and digitalization of the signals delivered by the sensors;

first computation means for the periodic computation, using these digitalized signals, of a so-called "estimated" position of the vehicle;

first random-access memory storage means to store the successive, estimated positions determining an "estimated" trajectory of the vehicle;

a mass memory forming a digital cartographic data base containing the point by point description of routes;

a reader, which works together with the mass memory to extract from the memory the cartographic data corresponding to a so-called "useful" zone. This zone is chosen to include the estimated position of the vehicle and to give, at least, information on direction linked to each point of the routes;

second random-access memory storage means, to store the data of the useful zone extracted by the reader;

a central processing unit for management and computation, to coordinate the working of the system according to a pre-established program;

a display device to display the useful zone as well as the position of the vehicle;

and a device to designate any point of the displayed image, wherein, to enable the automatic readjustment of the estimated trajectory at a readjustment point, the central processing unit compares the information on direction with pieces of information on direction extracted from the useful zone, within a window of imprecision, centered on the estimated position of the vehicle, the comparision consists in finding one and only one point, in the window, for which at least the direction is substantially the same as the information on direction at a given instant; this point forms the readjustment point when it is found;

and wherein the position of the vehicle, displayed by the display device, is the last position of the vehicle, whether it is obtained by the first computation means or by readjustment.

BRIEF DESCRIPTION OF THE DRAWINGS

The specific features and advantages of the present invention will appear from the following description, given by way of example and made with reference to the appended figures, of which.

DETAILED DESCRIPTION

Figures 1, 2:
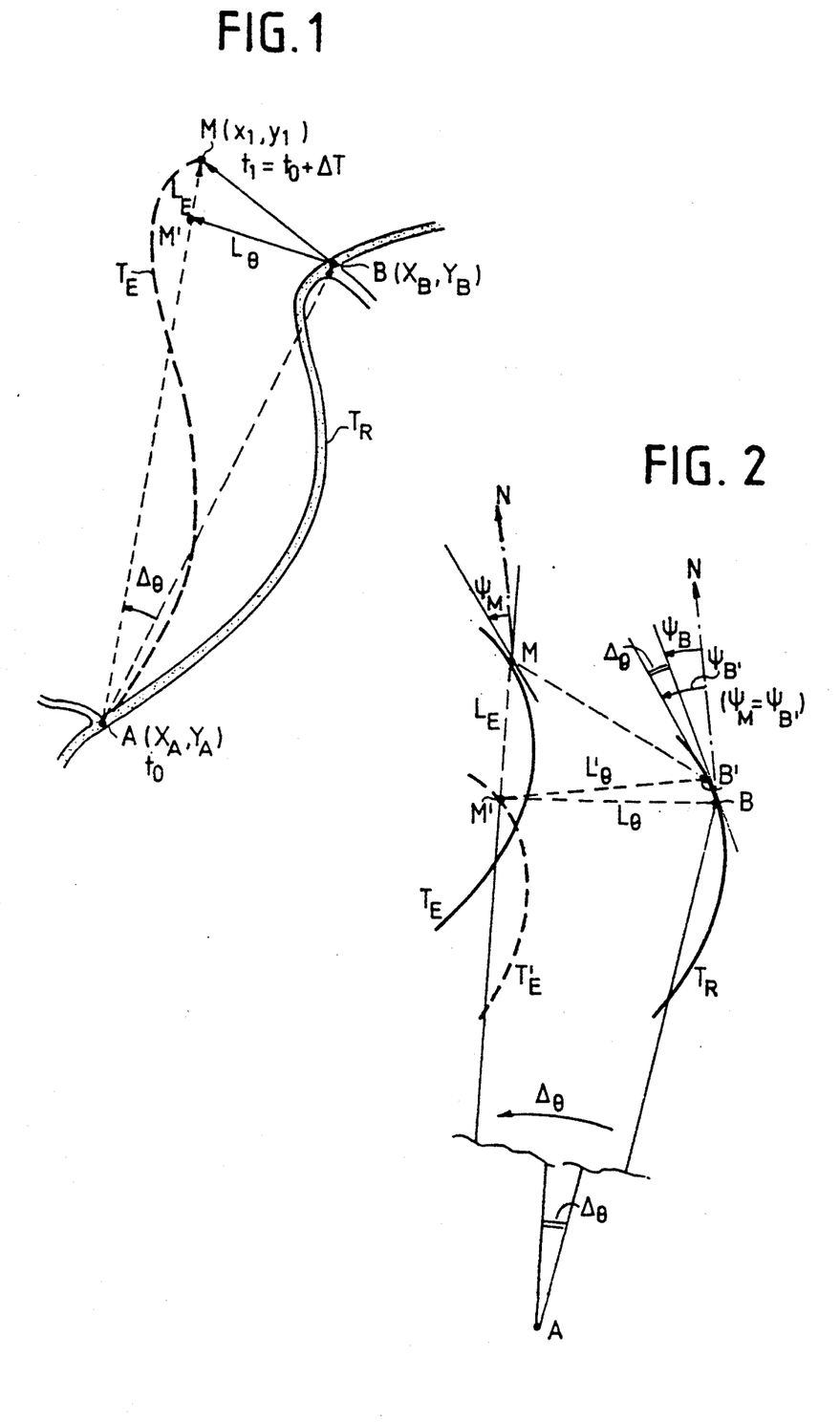
FIG. 1 is a diagram of the navigational deviations presented at a point of the estimated route with respect to the real path.
FIG. 2 is a drawing illustrating the principle of the measurement of differences, used in the system according to the invention according to the so-called equal caps method.

In the diagram of FIG. 1, TR represents the real trajectory, for example a road. This trajectory is given by a cartographic data base. This road may be pre-programmed, corresponding to the path to be taken by the vehicle, or it may be given automatically by the data base.

If the sensors and the navigation computations were to be perfect, then the estimated trajectory TE of the moving body would get superimposed exactly on the real trajectory TR.

The drifts and deviations presented, notably those shown by the sensors, mean that the computed representation of the moving body describes an estimated trajectory $T_E$ that is distinct from the real trajectory TR. Let A be the point of coordinates XA, YA corresponding to the initial point of the moving body, or to the last readjustment, done at an instant to. The point A is therefore common to both trajectories TR and TE at the initial instant to.

At the end of a period $t1 = to + T$, the respective positions of the moving body TE and TR have become $M(X_1, Y_1)$ for the estimated position, and $B(XB, YB)$ for the real position.

This real position B corresponds, during a readjustment, to a particular point on the road taken TR, which can be easily recognized by the operator. This point may be, for example, as shown, a road junction. A point such as this is called a "landmark". The coordinates of the point B are given by the cartographic data base upon the operator's command. This command may be given, for example, by pointing an optical pencil to the displayed map.

The estimation error $\overline{MB}$ may be broken down into two vectors $\overline{M'B}$ and $\overline{MM'}$ corresponding, respectively, to the angular drift $L_\theta$ between the directions AB and AM, and to the linear drift $L_e$ between the linear distances AB and AM. The estimation error MB is equal to the sum of these two parameters $L_\theta$ and $L_e$ which are given by the relationships:

$$\overline{L_\theta} = |AB| \cdot \overset{\wedge}{\Delta 0},$$

/0 being the angle between AB and AM.

$$\overline{L_e} = \overline{AM} - \overline{AB}.$$

Several methods may lead to the knowledge of the integrated drifts $L_0$ and $L_e$. First of all, a manual position-noting method is described. This method corresponds to an initialization stage preliminary to obtaining operation with automatic readjustment during which errors of measurement, essentially due to the sensors, are periodically compensated for automatically.

Before starting, the operator identifies some successive points or landmarks on his route (crossings, hills, bridges etc.). Through a hand-operated device (such as a joystick or an optical pencil), the operator designates these successive points B on the map to be shown on the display system. By this operation, the corresponding geographical coordinates, coming from the data base, are stored in a register. As his vehicle successively passes by each of these points, the operator uses a manual designating operation (such as a push-button or key) to actuate the storage of the corresponding, successive estimated points M1, M2, M3 measured by the sensors. In comparing, each time, the coordinates of the real point B and of the computed estimated point M, a deduction is made of the deviation measurement data corresponding to the components $L\theta$ and $L_e$ of the estimated error $\overline{MB}$. This makes it possible to compensate for the drifts by the sensors in the chain of computations. This preliminary readjustment stage imposes certain constraints on the user of the system, since it requires:

either preparing an itinerary and entering a certain number of selected landmarks along the route before starting in which case, the operator notes, without stopping that he passes each of the landmarks; without stopping;

or stopping en route at outstanding landmarks to perform the above-mentioned noting operations.

The manual method that has just been described should be carried out at least once on a landmark if the course is already known at the outset. Otherwise, it should be done at least twice on two landmarks. It enables a first readjustment before going into normal operation with automatic readjustment.

FIG. 2 illustrates the principle of measurement of deviations during a readjustment operation, according to a preferred method known as the "equal courses" method.

The estimated trajectory TE, given by the measuring chain of the sensors, is deduced from the real trajectory TR by two movements. A first movement is represented by a rotation with a center A and an angular amplitude $\Delta\theta$ that brings the real trajectory TR to T'E and the point B to M'. The second movement is a translational movement along the direction AM of the quantity $L_E$ which brings T'E to TE and the point M' to M.

The course $\psi M$ at the point M (the course corresponding to the angle between the tangent at M to the estimated trajectory TE and the direction N of the magnetic north) being known through sensors, for example, a gyrocompass or a magnetic compass, a search is made in the file of cartographic data, hence in the real trajectory $T_R$, for the point B' of coordinates XB', YB' which has the same course value, i.e. $\psi M = \psi B'$ and the same radius of curvature.

The point B' is thus recorded in a window of probability with dimensions that are predetermined, increase with the time counted from the last readjustment onwards, and are proportionate to the quality of the sensors.

Having found the coordinates of the point B' through the cartographic data file 7, and knowing the estimated point M, a deduction is made therefrom, by deviation measurement, of the estimation error B'M as well as of its components $L'_\theta$ and $L_E$.

In fact, except for the case of the rectilinear trajectory, a second order error is made in not taking into account the course drift between the computed position B' and the real position B. This is why it is possible to perform a subsequent operation in making a search, on the real trajectory TR, for the point B of coordinates XB, YB such that:

$$\overline{\psi B} = \overline{\psi M} - \overline{\Delta \theta} \text{ with } \Delta\theta \simeq \overline{B'M}/|AB'|.$$

In the window of probability, it is possible to find several equal course points. However, the risks of error are reduced to the extent that the readjustment operations are done at a fast rate. It is also possible to eliminate the trajectories for which the radii of curvature are too far from that computed at the estimated point M.

Another possible method, called the method of "likelihoods," consists in using the trajectory TE to find the trajectory TR having the greatest similitude in a window of probability. Several criteria of likelihood may be chosen. For example, using the coordinates X and Y of the points that form the trajectories TE and TR recorded in files, an analysis is made of the altitude and/or its derivative, of the radius of curvature and/or its derivative, etc. With the trajectory TR having been found in this way, the estimated position of the moving body is readjusted on this trajectory. An extraction is then made of the errors $L_E$ and $L_\theta$ as well as of the corresponding computations to be applied to the navigational computations.

The land navigation system according to the invention uses several readjustment methods in succession. A method of initialization, preferably manual, is used on the first part of the route. In effect, it enables an initialization of the sensors, particularly of the sensor of distance travelled. Then, a method of automatic readjustment is put into application.

Any navigation without the possibility of frequent readjustment requires sensors, the number and quality, and hence the complexity and the price, of which are directly related to the desired precision.

Through the almost permanent, periodic, readjustment that it achieves, the integration of the above-mentioned deviation measurement into the chain of navigation computations enables the use of inexpensive, rudimentary sensors. For wheeled vehicles, it is quite possible to envisage the use, for example, of only data from a mileage counter and a sensor of the vehicle's direction, preferably a magnetic sensor that directly gives the course, to have indications of distance/speed measurement and direction.

Figure 3:
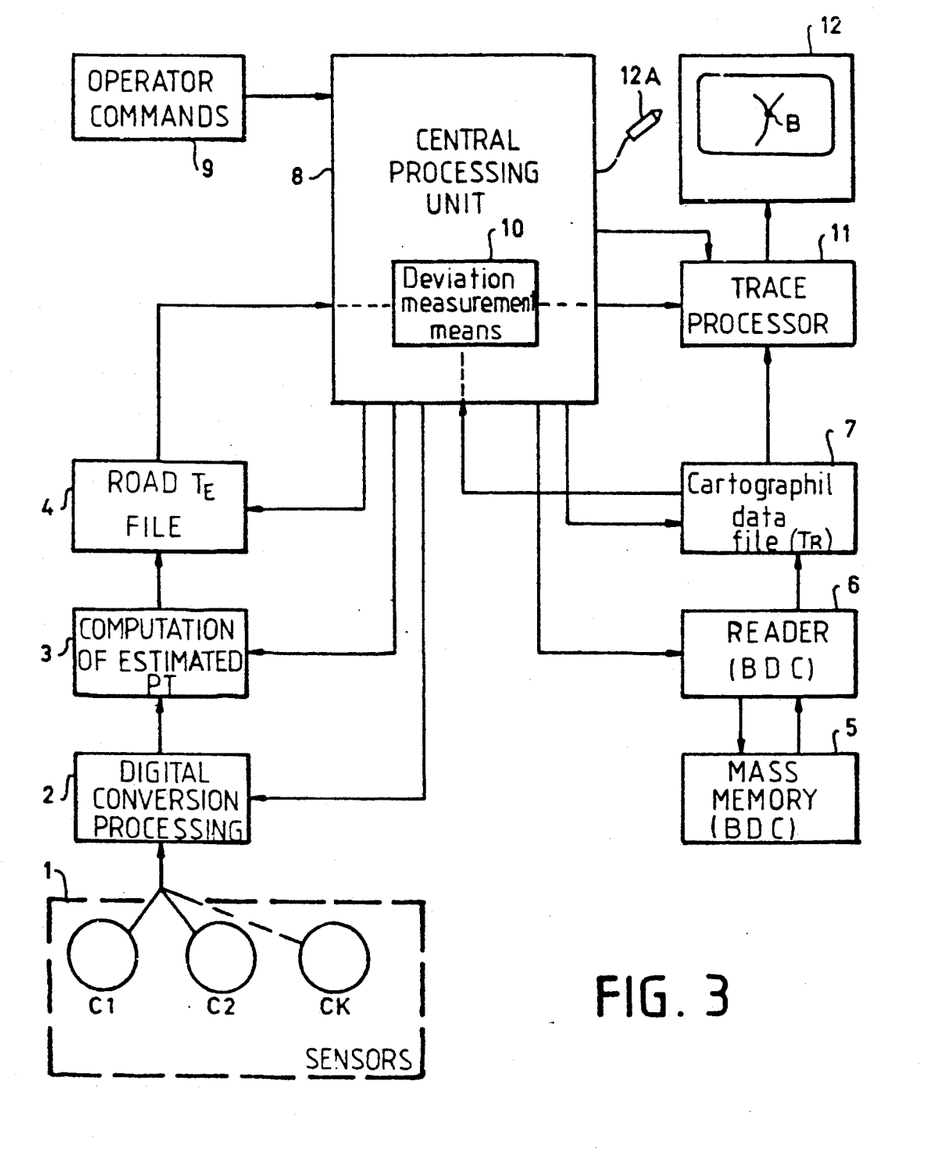
FIG. 3 is a general block diagram of a land navigation system according to the invention.

Referring to FIG. 3, the system for land navigation and real time display of the position of a vehicle has, first of all, a set of sensors C1, C2, ... Ck, ... mounted on the vehicle. This set has at least two sensors, one to give the information on the distance travelled and the other to give the orientation of the vehicle with respect to direction, for example the geographic north. Among the sensing devices possible are gyroscopes, gyrometers, magnetic compasses, altitude meters, odometers etc. At the very least, it is possible to envisage a case where the distance travelled is given by a mileage counter arranged accordingly, and that the orientation of the vehicle is given by an angle transmitter solidly joined to the direction control system.

The signals given by the sensors should be put into digital form for subsequent use. There is provision for an analog/digital conversion circuit for the analog signals. Furthermore, these signals may require processing operations, for example a reshaping operation before digitalization. All these functions are symbolized by a processing block 2.

The pieces of data from the digitalized sensors are transmitted to the block 3, which represents a computation of the estimated point. This computation is done almost permanently, at a clock frequency, so as to obtain the position of the vehicle in real time. The block 3 may consist of a microprocessor with corresponding programming or it may form part of a management and computation unit 8 which manages the different circuits of the system. The computation of the estimated point is transmitted to a corresponding file 4 which forms a random-access memory in which are stored the successive estimated points, namely the estimated trajectory TE of the vehicle.

The system also has a mass memory 5 forming a cartographic data base (BDC). In this read-only memory 5, are stored the cartographic data in digital form on a disk, magnetic tape or other medium. To this data base 5, there is added a reader 6 which, upon a command from the central processing unit 8, will extract the desired data for the display from the base 5, notably the real route taken TR. The data base 5 contains the description of the road infrastructure as well as other data (layouts of cities, bridges, forests, alphanumerical information etc.). Depending on the position of the moving vehicle, the reader module 6 picks up those pieces of data from the cartographic data base 5 that correspond to the useful zone to be displayed, and arranges them in a cartographic data file 7, formed by a random-access memory, after putting them into a form that can be exploited for deviation measurement at 10 and for display at 12.

The deviation measurement function is symbolized by a bloc 10 in which the estimated trajectory TE, coming from the file 4, is compared with the route TR taken or the probable routes resulting from the data stored in the file 7. The deviation measurement makes it possible to determine the deviation components $L_E$ and $L'_\theta$ of the point M of the estimated trajectory at the readjustment instant, and enables the readjustment of this estimated position M on the real route TR as well as the computation of corrections to be made to the indications of the sensors to compensate for the errors occurring between the two measurement points A, M.

The reader 6 contains the data needed in the form of codes to read, extract the cartographic digital data of the base 5 corresponding to the desired zone. This reader may include a microprocessor, which is itself controlled from the central processing unit 8.

The file 7 plays the dual role of a buffer memory, first for the pieces of navigation data (for example, the layout of the roads) which are extracted from the base 5 by the reader 6 and are necessary and sufficient for the deviation measurement, and second, for all the cartographic data of the useful zone with a view to display. One memory is enough to fill both these functions since the pieces of data of the map to be displayed already include the navigational data, including the route TR, and can be extracted according to a particular code. A block 11 is a trace (television or other) processor which, through the data resulting from the deviation measurement, enables the position B of vehicle to be marked on the map, and the entire map, relating to the zone being considered, to be displayed. It also enables this map to be oriented, for example along the direction of the course taken by the vehicle, or that of the geographic north.

The display device 12 can thus depict the corrected position B of the moving body, computed by the deviation measurement means 10, on a road map background extracted from the file 7. An optical pencil 12A or another device can be used by the manual operator to make note of the characteristic points, or landmarks, on the route taken TR and, hence, to designate these points to the central processing unit 8. It can also be used to perform the manual readjustment.

The central processing unit 8 for management and computation receives commands from an operator at 9, transfers pieces of information among the different blocks indicated and is programmed to produce the different computations of the position and readjustment of the vehicle. These pieces of information include initialization commands and other commands, for example commands on readjustment data sent towards the computation block 3, commands on readjustment of correction data sent towards the block 2, commands of the choice of the geographical sector sent towards the reader module 6 and commands on information on the mode of representation sent towards the module 11.

FIGS. 4 to 16 refer to a simplified exemplary embodiment of a land navigation system according to the invention, enabling a better understanding of the implementation of the navigation readjustment method used and of the operation.

Figure 4:
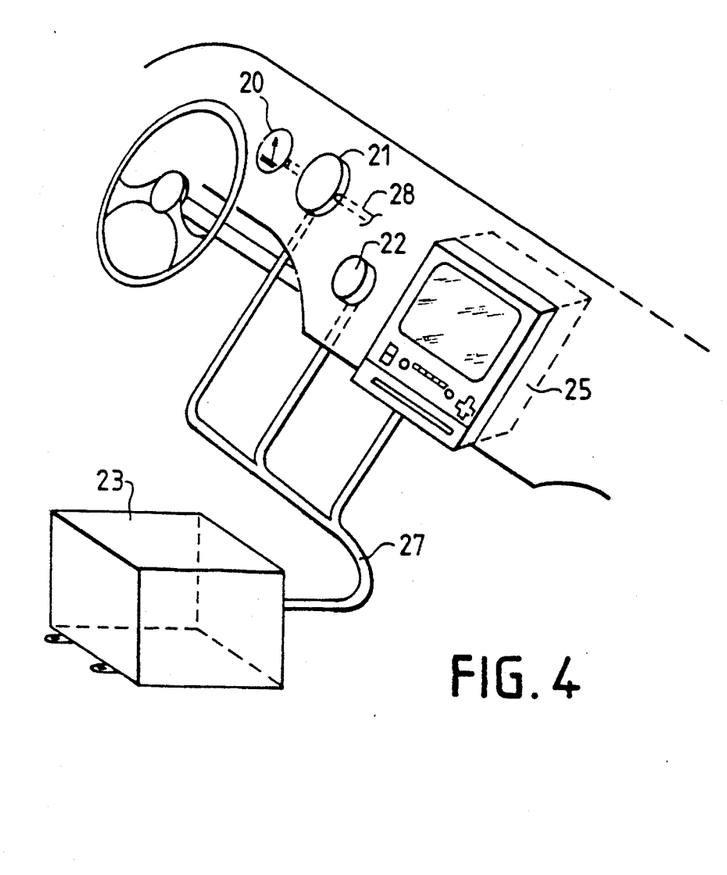
FIG. 4 is a simplified drawing of a navigation system according to the invention, mounted on a wheeled land vehicle.

The simplified navigation system shown in FIG. 4 has four main sub-assemblies: (a) a distance measuring sensor 21 placed in a pack, (b) a sensor 22 for measuring the direction of the vehicle, (c) a processing pack 23 localized in the vehicle in a place where it causes the least inconvenience, for example in the boot or trunk, and (d) a control and display unit 25 which may include the mass memory BDC.

These four sub-sets are connected to one another by wire links 27 and are powered from the DC network of the vehicle.

Figure 5A:
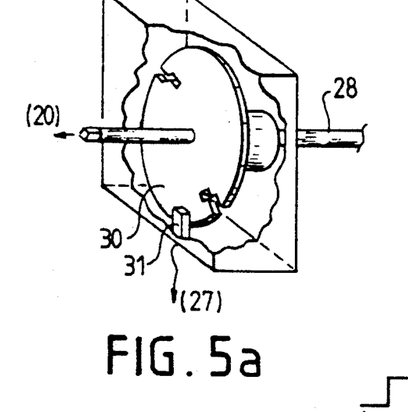
FIGS. 5a to 5d are drawings and waveforms pertaining to an embodiment of a distance sensor travelled in the system according to FIG. 4.
Figure 5B:
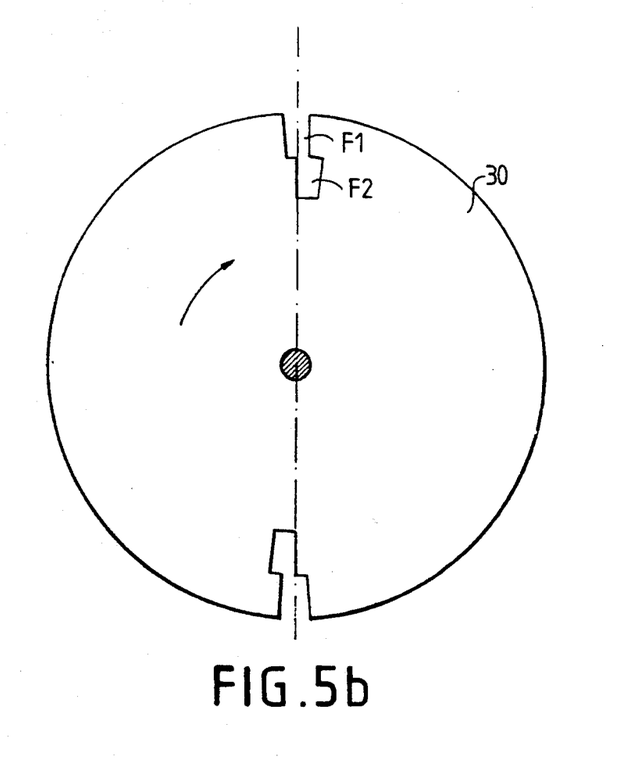
Figure 5C:
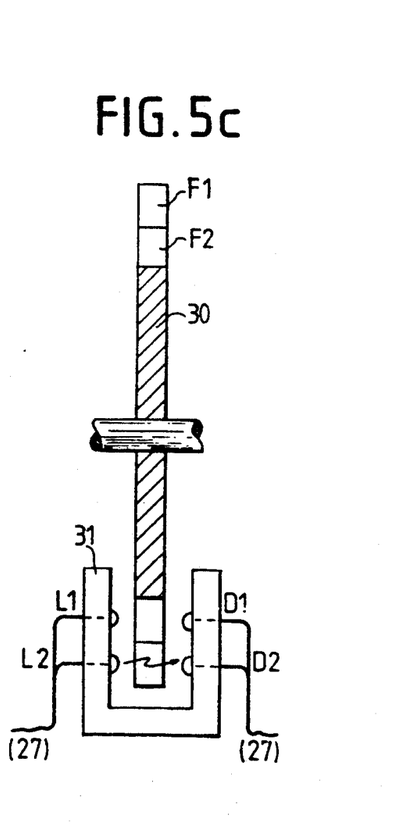
Figure 5D:
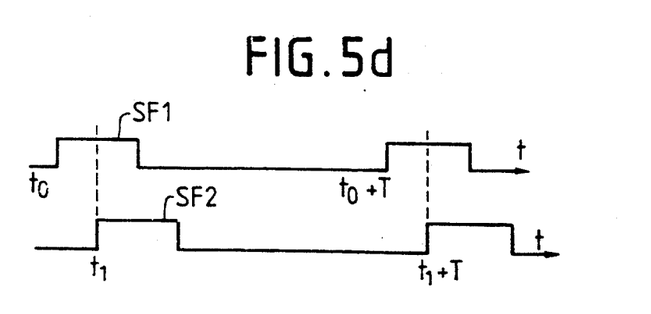

The distance measuring box 21 is interposed between a standard mileage indicator 20 mounted on the dashboard of the vehicle and the tip of a cable 28 to which the indicator is connected. The distance measuring box 21 may be formed as shown in FIG. 5a and according to the detailed FIGS. 5b and 5c. On the cable 28 side, it has a female connector adapted to receiving this cable and, at its other end a male connector corresponding to the connector of the cable which is coupled to the mileage indicator 20. It is formed essentially by a disk 30 driven by the cable 28. A disk 30 has one or more tracks of transparent slots F1, F2. On either side of the disk, and at the slots, are positioned a set 31 of light-emitting diodes L1, L2 on the one hand and optoelectronic receivers D1, D2 on the other hand. During the movement of the vehicle the disk is driven by the rotation of the cable 28. The optoelectronic receivers receive, respectively and successively, the light from the emitting diode associated with the passage of the respective slots. This gives the waveforms shown in FIG. 5d for a cut-out pattern of the slots according to the profile shown. This cutting out includes a first slot F1 followed by a second slot F2, offset with respect to each other by a half width of a slot. On a radius, the emitter/receiver pairs are placed in such a way that there are two detected signals SF1 and SF2, phase shifted in time, which subsequently make it possible, by processing in the corresponding interface card of the processing package 23,
to identify, the direction of rotation of the disk and, hence, to know whether the vehicle is going forward or backward.

Figure 10:
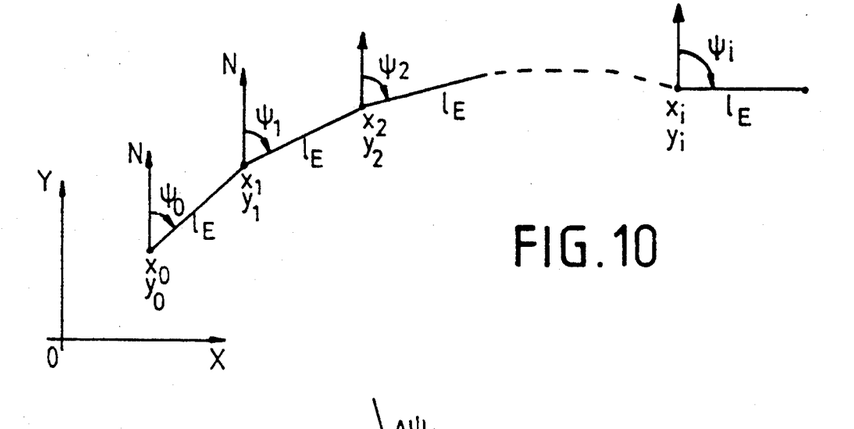
FIG. 10 is a diagram pertaining to the preparation of the estimated route.

Knowledge of the distance travelled by the vehicle is obtained at the same time by counting the pulses SF1 and SF2 (one pulse per semi-revolution in the case represented) given by the optoelectronic receivers D1 and D2 during the rotation of the disk. This counting is done in the corresponding sensor interface card of the processing pack (FIG. 10).

The direction sensor 22 of the vehicle is a magnetic compass. Its function is to give an electrical signal corresponding to the direction of the vehicle with respect to the magnetic north, namely the course. Any system enabling the encoding of an angle may be used: for example, an optoelectronic sensor or a synchro generator, etc. In the proposed application, use of an optical encoder is preferred. The encoded angle information is sent to the processing pack 23 by the links 27.

Figure 6A:
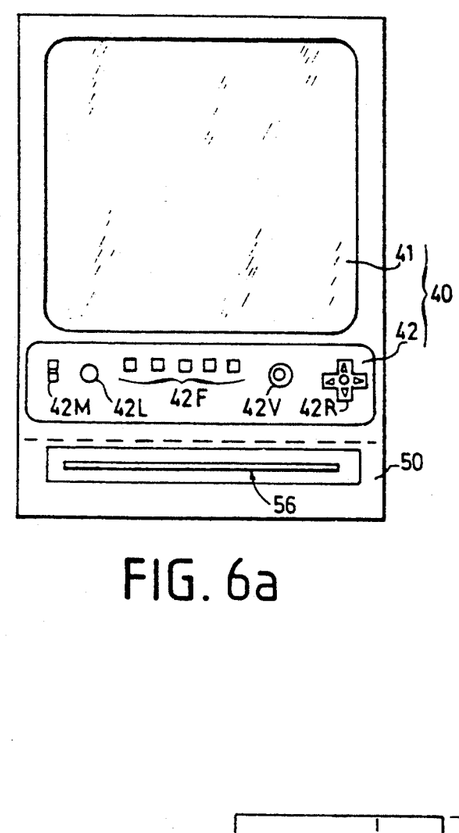
FIGS. 6a and 6b are drawings of the display set, also bringing together the operator and mass memory reader controls used in the embodiment according to FIG. 4.
Figure 6B:
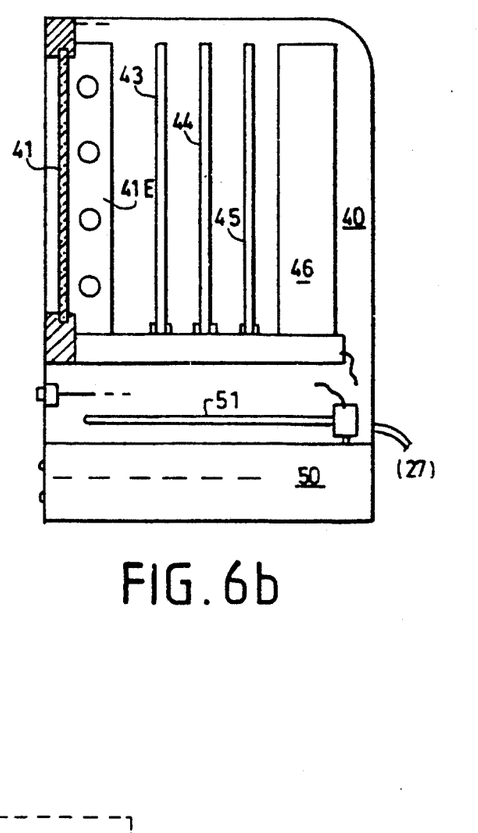

The control and display unit 25 is shown in a frontal view in FIG. 6a and in a side, sectional view in FIG. 6b. It consists of two main parts which may be dissociated functionally but may be combined, as depicted, if available space in the vehicle allows it. These two parts are, first, a control and display unit 40, proper, which corresponds to the elements 9, 11 and 12 of FIG. 3, and a mass memory reader 50. In this embodiment, the mass memory is formed by a detachable element which is a digital optical disk 56. In this sense, this latter part 50-56 encompasses the elements 5 and 6 of FIG. 3.

The control and display unit 40 essentially consists of a color LCD flat panel 41, for example with a square format, the dimensions and resolution of which should be sufficient for easy reading of a road map. The minimal dimensions to be provided for an embodiment such as this are five inches by five inches for the screen, that is, 12.7 cm. square, and 250,000 pixels on the screen. This screen may be fitted out, in the rear, with an illumination pack 41E enabling, inter alia, operation by night. The setting of the light intensity of this illumination is done by a control 42L that is accessible by the operator and placed on a band 42 of the front face of the station 40.

The band 42 contains all the operator controls, namely an on/off control 42M, the luminosity control 42L, function keys 42F with interactive control (depending on the desired configurations, the function of these keys may be displayed on the screen in front of each of them), a validation pushbutton 42V, commands for shifting an indicating hair cross 42R (this latter element fulfils the function of the optical pencil 12A of FIG. 3 as a designating element).

The other elements that can be seen in FIG. 6b are a graphic card 43, combining the graphic processor, video memory and screen interface functions; a memory card 44, with working random-access memory and program memory, and a card 45 combining the central processing unit and interface functions, and supplies 46.

At the lower part, the mass memory reader 50 has mechanisms (not shown) for driving and for reading the digital optical disk 56, and control and interface cards 51.

Figure 8:
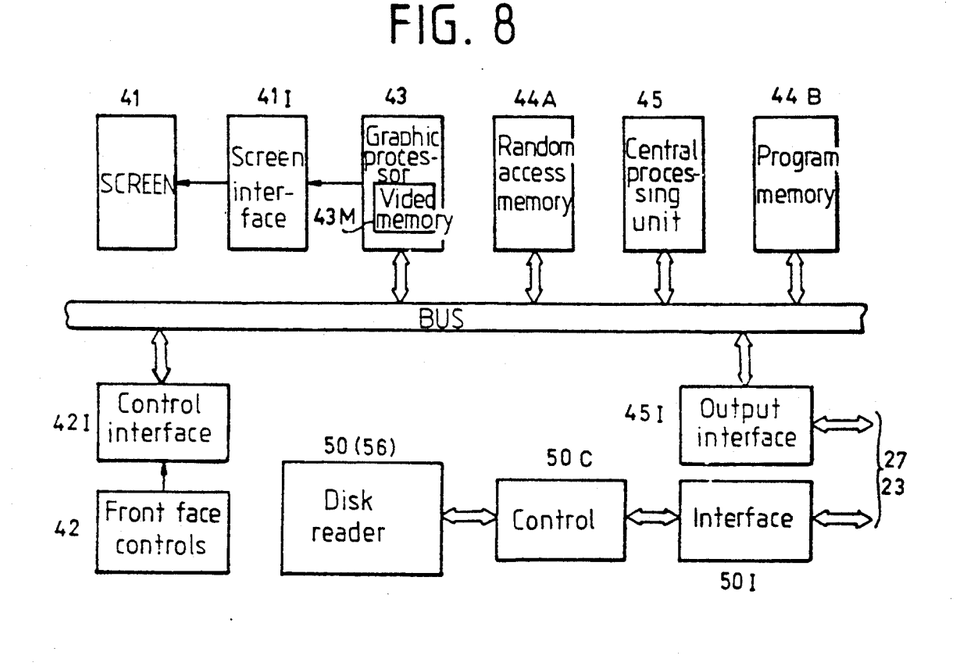
FIG. 8 is a diagram of the circuits of the control station.

The functional diagram of the control and display unit 25 is shown in FIG. 8. The working of the control station is organized around a microprocessor-based central processing unit 44, 45 which manages the front face 42 commands through a control interface 42I, interprets them and translates them either into graphic symbology for display on the screen 41 of the meaning of the keys (interactive command) or into messages intended for the processing pack 23 (position of the hair cross, reading of the mass memory, zooming, orientation and movement of the map). The central processing unit 45 prepares the graphic primitives of the display symbology and arranges them in video memory 43M, according to display instructions given by the processing pack 23. This unit 45 manages the recording, in the video memory 43M, of the road map for which the graphic primitives come from the processing pack 23. For the transition between two map sectors to take place with delay, the memory 42M is split up into two zones. While one zone is read by the graphic processor, the other is loaded by the central processing unit 45. After each commutation of a geographic sector, there is a reversal of the role of the memory zones. The central processing unit 45 manages the exchanges with the processing pack through the output interface 451.

An internal connecting bus links the central processing unit 45 to random access memsory 44A, a program memory 44B, the control interface 42I and output interface 45I and the graphic processor 43 with its video memory 43M. The program of the central processing unit 45 is written in the read-only memory at 44B.

According to the instructions written in the video memory 43M by the central processing unit 45, the graphic processor reads, in the designated zone, the graphic primitives needed for the depiction of the map, its movement, the display of the symbology (position of the vehicle, different hair crosses, alphanumeric parameters) and translates them into the addressing of the cells of the screen 41. These cells are excited with the appropriate electrical signals, through the screen interface 41I.

Figure 7:
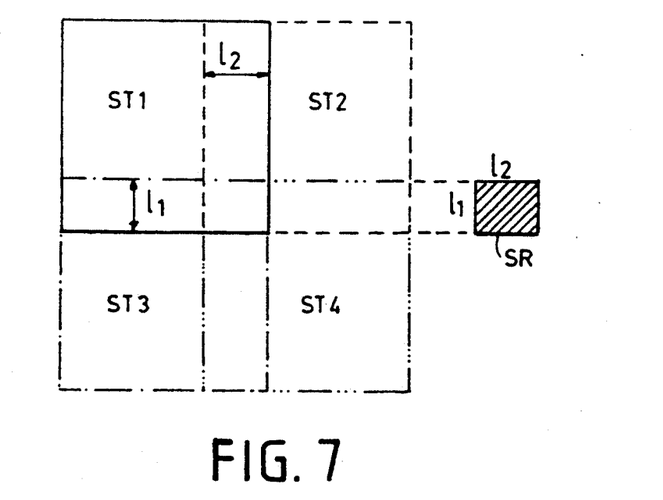
FIG. 7 is a diagram illustrating the organization of the mass memory, notably the intersection of the geographical sectors of the memorized map.

In the application envisaged, the mass memory 56 is a digital optical disk. The associated reader 50 is made up of a reading mechanism with its control circuit 50C and interface circuit 50I for interfacing with the processing package 23. The digital optical disk 56 contains the description of road maps, that is:

the layout of the roads in the form of a sequence of elementary vectors, cultural information: towns, forests, bridges, high-voltage lines, railway lines etc.;

alphanumerical information, names of roads, sites, towns etc.;

the map files contained in the disk are formed by overlapping geographical sectors, the principle of which can be seen in FIG. 7, where four rectangular sectors ST1, ST2, ST3, ST4 are considered. The hatched zone SR corresponds to the map zone that can be displayed on the screen, and the corresponding dimensions are taken into account to constitute the minimum dimensions of interzonal overlapping.

The road description files are distinct from files of a cultural nature because the deviation measurement means must work on the road description files to readjust the estimated route to the true route.

Figure 9:
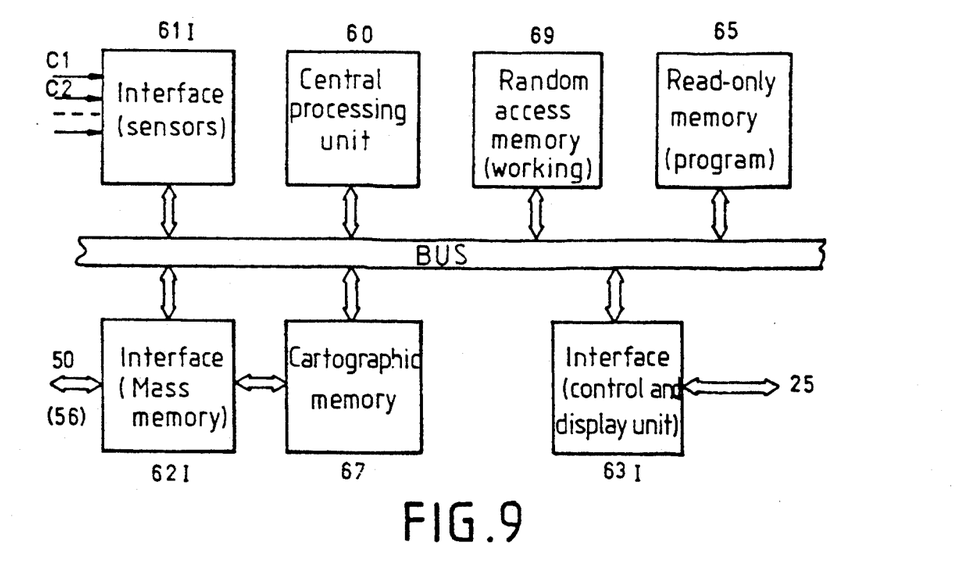
FIG. 9 is a diagram of the circuits of the processing pack.

FIG. 9 shows a diagram of the processing pack that manages all the navigation systems. It interfaces with the other pieces of equipment through interface sensor 61I that interface with the distance measuring sensor 21 and direction measuring sensor 22, through interface circuits 62I interfacing with the optical disc or mass memory 56 and interface circuits 63I interfacing with the control and display unit 25.

The processing package is organized around a microprocessor-based central processing unit 60 which interacts with the functional units represented in the diagram of FIG. 9 by means of a linking bus. These functional units are:

the above-mentioned interfaces 61I, 62I and 63I, a program read-only memory 65 containing the programs of the central processing unit, a working cartographic map 67 which is shared between a reading zone and a writing zone and contains the road files of the geographic working sectors, a working random-access memory 69.

The processing done in the pack 25 is based on the following. The trace of the estimated route may be broken down into sequenced elementary vectors having a length $1_E$ and an angle with respect to a reference direction, such as the course with respect to the geographic north (FIG. 10).

To reduce the errors on the estimated route to the minimum, the elementary length $1_E$ should be fairly small. For example, the value taken is the route travelled between two pulses given by the distance measuring pack 21, i.e. a half-revolution of the disk 30.

Figures 11, 12:
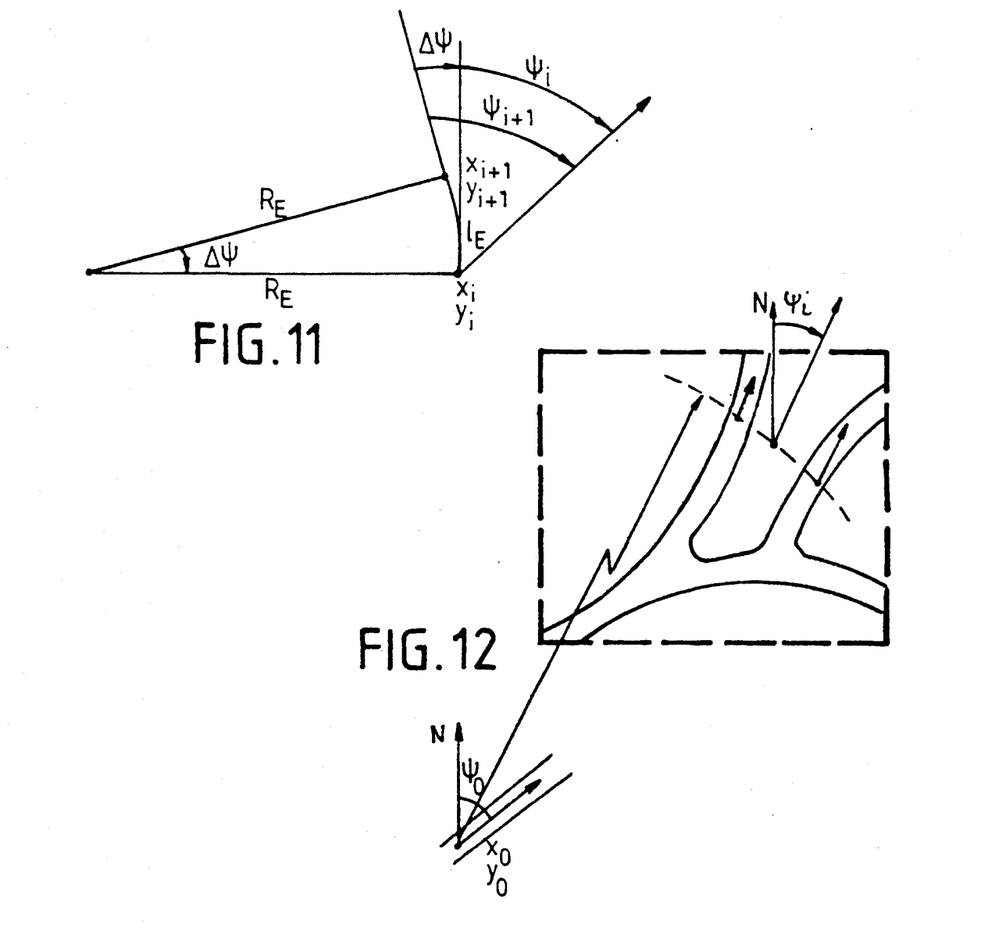
FIG. 11 is a diagram illustrating the parameters that come into play at each estimated route increment.
FIG. 12 is a diagram illustrating the possibility of obtaining several real points that might lead to a new initialisation stage.

Then, if $\Delta \psi$ is the estimated course variation between two elementary vectors (FIG. 11), we can write:

$\Delta \psi_i = 1_E / R_E$, where $R_E$ is the estimated steering radius of the vehicle and the successive points considered are order i and order i+1 points.

In a Cartesian frame of reference X, Y, the Y axis of which is pointed northwards, the cartographic coordinates of each of the points $x_i y_i$ are given by the formulae:

$$x_{i+1} = x_i + 1_E \sin \psi_i$$

$$y_{i+1} = y_i + 1_E \cos \psi_i$$

$\psi_i$ is the instantaneous value given by the magnetic compass 22. The proximity of metallic masses in the vehicle disturbs the angle indications given by the sensor and make them non-linear as a function of the angle of orientation of the vehicle. It is considered that these errors are perfectly compensated for according to known techniques, either by magnets placed around the sensor or by values recorded in a compensation table written in the read-only memory 65 of the processing pack 23. There is only one zero error in the indication of the magnetic compass. The measured value of the course is then written: $\psi_m = \psi_R + \epsilon_U$ where $\psi_m$ = course indication given by the sensor 22, $\psi_R$ = real course value, $\epsilon_U$ = zero error With the distance measuring box 21, we obtain the estimated value $1_E$ of the elementary distance travelled:

$$1_E = 1_m (1 + \epsilon_1)$$

with $1_m$ = route measured by the distance counter $\epsilon_1$ = error on the distance measurement coefficient and errors due to skidding of wheels, wear and tear on tires, etc.

Figure 13:
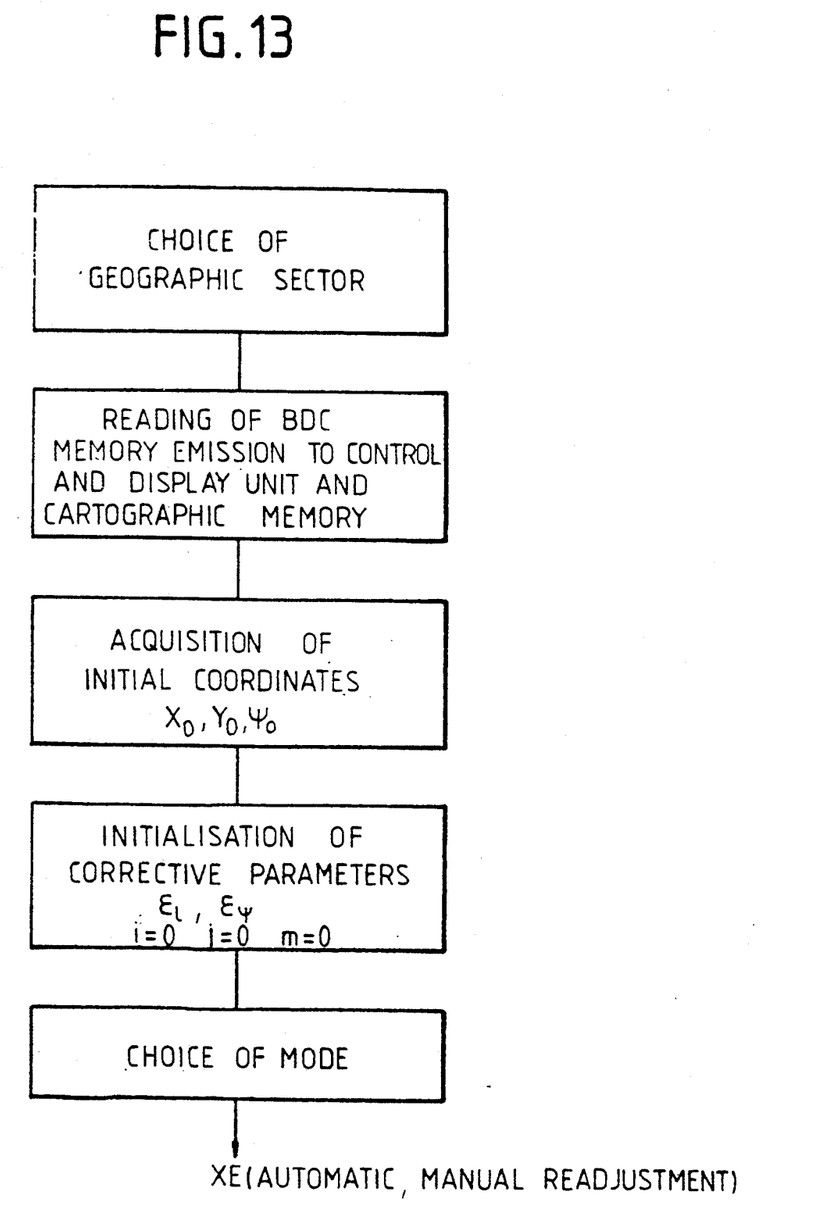
FIG. 13 is a flow chart pertaining to the initialization of the program.

FIG. 13 is a processing flow chart relating to the initialization stage of the program. Through interactive commands, the operator chooses the geographical sector in which he is located. All the files concerning this sector (roads, cultural information) are read in the disk 56 and sent to the control and display unit 25 with a view to the display of the useful zone while the files concerning the layout of the roads are stored in the working cartographic memory 67 of the processing pack 23.

Then, by means of his hair cross, the operator enters the starting coordinates of the vehicle ($x_o$, $y_o$). The initial course value $\psi_o$ is given by the sensor 22. When there is no magnetic sensor, an estimated value will be designated at the start.

Figure 14:
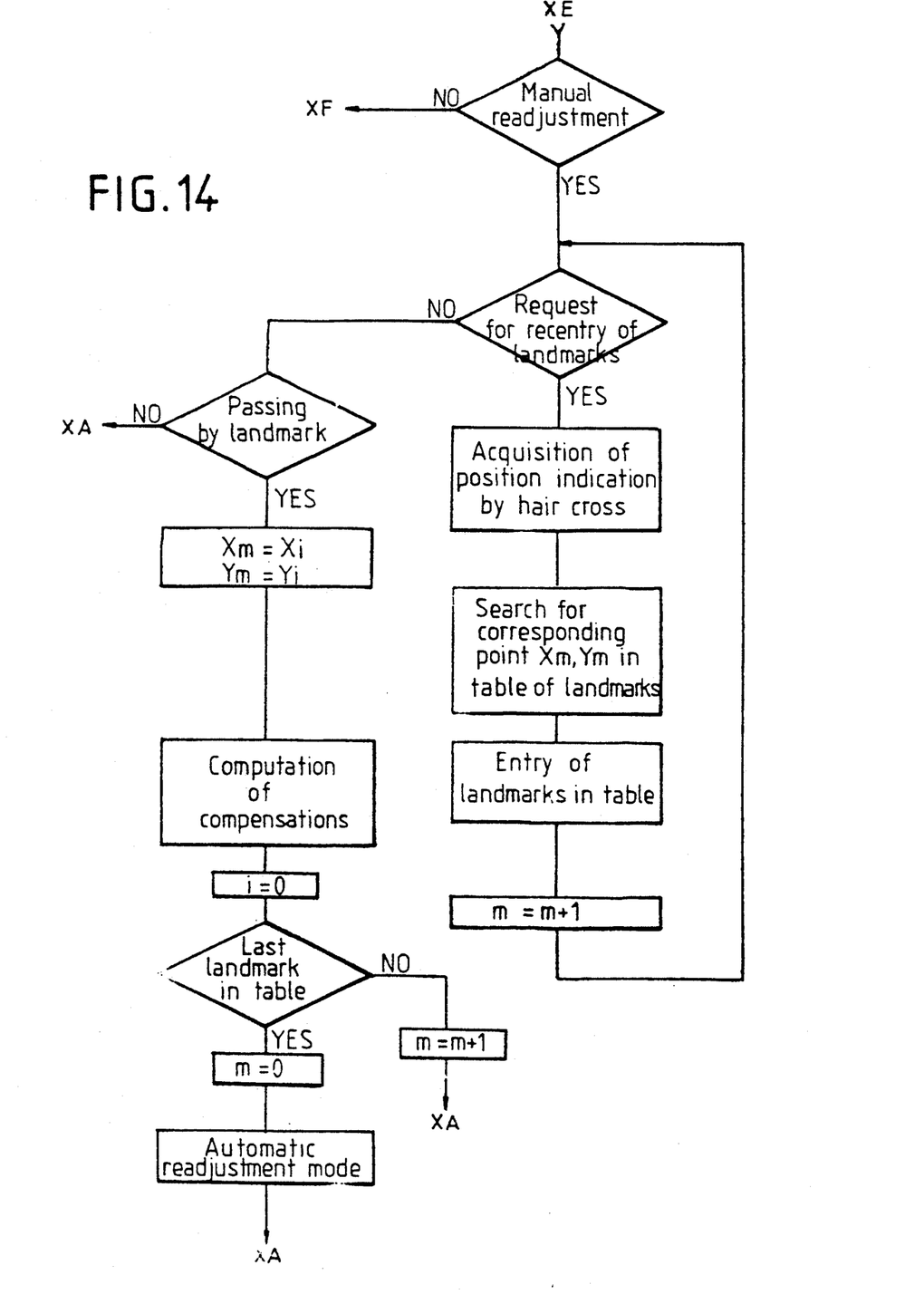
FIG. 14 is a flow chart pertaining to the method of manual readjustment by landmarks for initialization.
Figure 15:
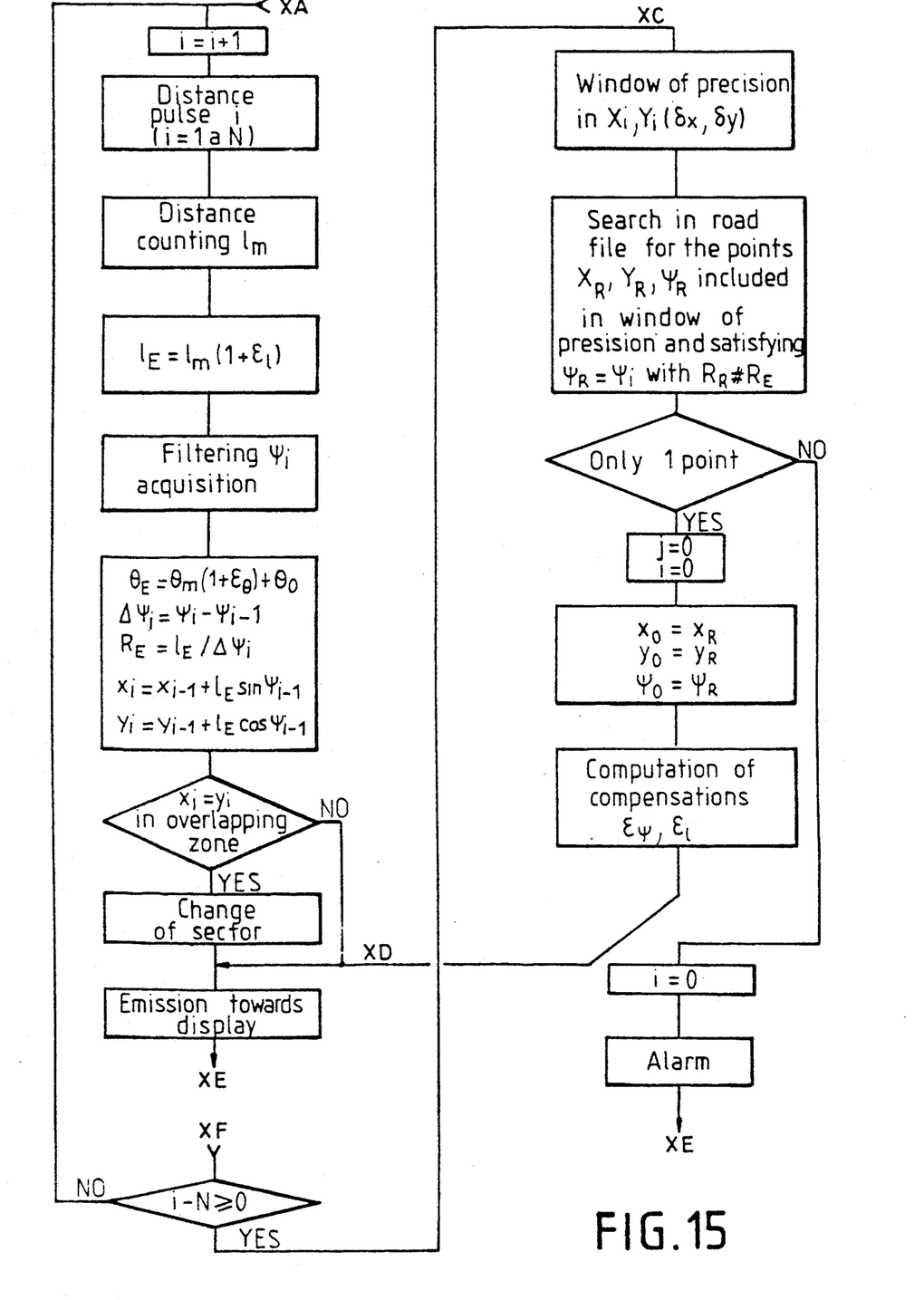
FIG. 15 is a flow chart pertaining to the automatic readjustment system and to the computation of the estimated trajectory.

The program is then initialized with the correction parameters $\epsilon_1, \epsilon_\psi$ previously memorized and coming either from a manual adjustment or from the computation of the comensations, done automatically subsequent to a manual readjustment (FIG. 14) or automatic readjustment (FIG. 15).

The manual readjustment on landmarks is illustrated by the flow chart of FIG. 14. Unless the correction parameters ($\epsilon_\psi$, $\epsilon_1$) have been preserved in the memory and are considered to be certain, the operator, during the first kilometers of his route, should make a note of at least one landmark (road intersection, bridge), localized on his map.

To this end, he asks for the manual readjustment mode through the control keyboard. The program is then shunted to the request for the re-entry of the landmarks. Each of them is designated, in the planned order of passage, by the position of the hair cross which he moves on the screen by means of the hair cross shifting commands 42R (FIG. 6a) and which he validates by pressing the validation pushbutton 42V. The successive coordinates of the landmarks ($x_m$, $y_m$) referenced with respect to the geographical sector displayed on the screen, are re-entered in a table of landmarks.

When the operator no longer asks to re-enter landmarks, the program is shunted towards the "passing by landmark" condition which is manually triggered by the operator when his vehicle crosses one of the landmarks that he has designated beforehand.

As long as the condition is not achieved, the program is shunted at each cycle in XA towards the program for computing the estimated route (FIG. 15) and returns to XE. This program, explained further below, computes the estimated coordinate points $x_1, y_1$.

As soon as the "passage by a landmark" is detected, the last computed estimated point $x_1, y_1$ is compared with the first landmark found in the landmark table ($x_m$, $y_m$). In making the coordinates of these two points coincide, filtering algorithms make it possible to bring out the parameters of compensations $\epsilon_\psi$, $\epsilon_1$ which are memorized to be used in the next iterations.

After incrementing the landmarks counter, the program returns at XA towards the computation of the estimated trajectory. The program cycle then proceeds as described previously until the last landmark recorded in the table. After the last landmark recorded in the table is processed, the "automatic readjustment" mode is laid down, until the operator again requests the "manual readjustment" mode.

The computation of the estimated trajectory is illustrated in the flow chart of FIG. 15. This computation program starts at the point XA and comprises a certain number of iterations, to each of which may correspond a pulse of the distance measuring pack. Between two iterations, the vehicle is considered to have travelled an estimated elementary length $1_E$, and a new point of the estimated trajectory is computed, memorized and sent to the display station to be displayed in superimposition with the geographical sector.

After acquisition and filtering of the indications $\psi_m$ given by the direction sensor, at each iteration the coordinates of a new point as well as the radius of curvature of the trajectory at this point are computed according to the previously indicated formulae, in taking into account the compensation parameters $\epsilon_1$, $\epsilon_\psi$ previously recorded in memory and derived from the automatic or manual readjustment algorithms.

When the point $x_i$, $y_i$ is found in an overlapping zone (FIG. 7), a program triggers the reading of the disk 56 in order to put the sector, adjacent to the one in which the vehicle is moving, into the working cartographic memory. The files of this new sector are also sent to the control and display unit for display.

In normal working mode, i.e. with "automatic readjustment", the program for computing the estimated trajectory goes to the point XF where the iteration number is compared with a number N for which the program is shunted at XC towards the automatic readjustment computation, with a return to XD.

The number N of iterations may be determined according to the configuration: scale of the map, appearance of the roads (infrequent curves or hairpin curves), gradient of the road ($\epsilon_\psi$ high), etc. In effect, it corresponds to the interval of distance I=N1 of the points of the estimated route on which an automatic readjustment is done.

Around the last point $x_i y_i$ computed, a window of imprecision with predetermined dimensions $\delta x$ and $\delta y$ is opened. The dimensions of this window increase with the distance between two successive readjustment points. The program makes a search, in the road file of the concerned geographical sector, for the point or points that are included in the window of imprecision, meet the condition of equality of the elementary courses (equal courses method) $\psi_R = \psi_i$ and have radii of curvature $R_R = R_E$, close to one another, $\psi_R$ and $R_R$ being, respectively, the course and the radius of curvature of the point found on the layout of the real route $T_R$ (point B' of the line 2).

The description of the routes, which has been done by a succession of elementary vectors $\psi_c$, is found by interpolation (nearest stored value).

If several points meet the condition (FIG. 12), the program continues without readjustment and the operator is alerted accordingly so that he asks for manual readjustment if he deems this to be necessary. If not, a new automatic readjustment is done after N other iterations.

When the equal course point is an only one, the algorithms for readjustment $x_i y_i$ on $x_o y_o$ are done, with a reinitialization of the interations counter i:

$x_o = x_R$ $y_o = y_R$ $\psi_o \psi_R$

The algorithms used for the computation give a filtering that makes it possible to bring out the compensation parameters $\epsilon_1$, $\epsilon_\psi$ which are memorized to be used in the next iterations. This method tends, in the course of time, to refine the compensations that have to come into play.

What is claimed is:

1. A land navigation system for a vehicle having a position and a direction and adapted to travel at a distance from a reference position, for displaying the position of the vehicle in real time, said system comprising:

sensor means (1) for preparing signals representing parameters of movement of the vehicle, including at least information on the distance travelled from the reference position, and information on the direction of the vehicle;

means for processing and digitalization (2) of the signals from the sensor means;

first computation means (3) for periodic computation using said digitalized signals, of an estimated position (M) of the vehicle;

first random-access memory storage means (4) for storing the successive estimated positions and for an estimated trajectory (TE) of the vehicle;

a mass memory (5) forming a digital cartographic data base comprising point by point description of routes;

a reader (6) connected to the mass memory to extract therefrom the cartographic data corresponding to a selected zone chosen to include the estimated position of the vehicle and to give information on each point of the routes in the selected zone;

second random-access memory (7) storage means, for storing the data of the selected zone extracted by the reader;

a central processing unit (8) for management and computation, to coordinate the land navigation system according to a preestablished programming;

a display device (11, 12) to display in image of the selected zone as well as the position of the vehicle;

and a device (12A) to designate any point of the displayed image, wherein, to enable the automatic readjustment of the estimated trajectory at a readjustment point, the central processing unit comprises means for comparing the information on direction form the sensor means with information on direction extracted form the mass memory in the selected zone, within an imprecision zone centered on the estimated position of the vehicle, the comparison consisting in finding points, in the imprecision zone, for which at least the vehicle direction is substantially the same as the information on direction at a given instant, said comparison being continued until only one point is found in the imprecision zone, and this only found point forming the readjustment point;

and wherein the position of the vehicle, displayed by the display device (11, 12) is the last position of the vehicle, whether it is obtained by the first computation means or by said automatic readjustment.

2. A navigation system according to claim 1, wherein the central processing unit is programmed to compute the variations in direction, relating respectively to the information on direction given by the sensor means and to the information on direction stored in the second storage means for each of the points of the imprecision zone having substantially the same direction as that of the information on direction given by the sensor means, so as to find said only one point, in the imprecision zone, for which at least the direction stored in the second storage means and the variation in direction stored in the second storage means are substantially the same as, respectively, the information on direction given by the sensor means and the variation in direction corresponding to the information on direction given by the sensor means.

3. A navigation system according to claim 1 or 2 wherein, for any given readjustment operation, preceded in time by another readjustment operation, the direction of the vehicle after the given readjustment operation is taken to be equal to the direction at the given readjustment point (B) modified by an angle of correction ($\Delta\phi$) in which the vertex of said angle of correction is the reference point (A), and the sides of said angle of correction pass respectively through the given readjustment point and the estimated position (M) of the vehicle just before the given readjustment operation.

4. A navigation system according to claim 1, wherein the central processing unit is programmed to correct the information from the sensor means as a function of the difference between the distance between each said readjustment point and the reference point and the distance between the estimated point of the vehicle just before the readjustment operation considered and the reference point.

5. A navigation system according to claim 3, wherein the central processing unit is programmed to correct the information from the sensor means as a function of the angle of correction.

6. A navigation system according to claim 1, wherein, at a given instant, the reference point is one of the readjustment points determined at an instant preceding said given instant.

* * * * *